United States Patent
Penno et al.

(10) Patent No.: US 10,355,983 B2
(45) Date of Patent: Jul. 16, 2019

(54) TRACEROUTE TO RETURN AGGREGATED STATISTICS IN SERVICE CHAINS

(71) Applicant: Cisco Technology, Inc., San Jose, CA (US)

(72) Inventors: Reinaldo Penno, Milpitas, CA (US); Carlos M. Pignataro, Raleigh, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 15/149,695

(22) Filed: May 9, 2016

(65) Prior Publication Data

US 2017/0324651 A1  Nov. 9, 2017

(51) Int. Cl.
| | |
|---|---|
| H04L 12/28 | (2006.01) |
| H04L 12/721 | (2013.01) |
| H04L 29/06 | (2006.01) |
| H04L 12/26 | (2006.01) |
| H04L 29/08 | (2006.01) |
| H04L 12/24 | (2006.01) |

(52) U.S. Cl.
CPC .......... *H04L 45/26* (2013.01); *H04L 41/5009* (2013.01); *H04L 41/5032* (2013.01); *H04L 43/06* (2013.01); *H04L 67/327* (2013.01); *H04L 69/22* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 9,825,856 | B2* | 11/2017 | Yong | H04L 45/74 |
| 2008/0212484 | A1* | 9/2008 | Kaminsky | H04L 41/12 370/248 |
| 2009/0037713 | A1* | 2/2009 | Khalid | H04L 12/4633 713/1 |
| 2011/0170426 | A1 | 7/2011 | Kompella et al. | |
| 2013/0329572 | A1* | 12/2013 | Gintis | H04L 43/026 370/244 |
| 2014/0293798 | A1* | 10/2014 | Kang | H04L 43/10 370/241.1 |
| 2014/0362682 | A1 | 12/2014 | Guichard et al. | |
| 2014/0362857 | A1* | 12/2014 | Guichard | H04L 45/566 370/392 |

(Continued)

OTHER PUBLICATIONS

R. Penno et al., "Services Function Chaining Traceroute" draft-penno-sfc-trace-03, SFC Netmod, Internet-Draft, Sep. 30, 2015, 9 pages.

*Primary Examiner* — Bob A Phunkulh
(74) *Attorney, Agent, or Firm* — Edell, Shapiro & Finnan, LLC

(57) ABSTRACT

A packet is received at a network device hosting a service function that is part of a service chain. The packet is sent to the network device from an originating network device. The content of the packet is analyzed to determine that the packet comprises a request for statistical values to be aggregated by the network device. The statistical values are aggregated at the network device. A report comprising the statistical values aggregated at the network device is generated. The report is sent to the originating network device.

20 Claims, 8 Drawing Sheets

(56) References Cited

U.S. PATENT DOCUMENTS

| | | | | |
|---|---|---|---|---|
| 2015/0124629 A1* | 5/2015 | Pani | .................. | H04L 12/18 370/248 |
| 2016/0028640 A1* | 1/2016 | Zhang | .................. | H04L 45/306 370/389 |
| 2016/0112337 A1* | 4/2016 | Zhang | .................. | H04L 47/35 370/237 |
| 2016/0134531 A1* | 5/2016 | Assarpour | .................. | H04L 45/74 370/392 |
| 2016/0142291 A1* | 5/2016 | Polland | .................. | H04L 45/36 370/392 |
| 2016/0226744 A1* | 8/2016 | Al-Zoubi | .................. | G06F 11/263 |
| 2016/0337202 A1* | 11/2016 | Ben-Itzhak | .................. | H04L 45/745 |
| 2017/0041201 A1* | 2/2017 | Ilyadis | .................. | H04L 43/08 |
| 2017/0064039 A1* | 3/2017 | Shen | .................. | H04L 67/327 |
| 2017/0180218 A1* | 6/2017 | Rasanen | .................. | H04L 41/5051 |
| 2017/0250917 A1* | 8/2017 | Ruckstuhl | .................. | H04L 45/306 |
| 2018/0139096 A1* | 5/2018 | Lee | .................. | H04L 41/0893 |
| 2018/0198717 A1* | 7/2018 | Khasnabish | .................. | H04L 43/026 |

* cited by examiner

TRACEROUTE TO RETURN AGGREGATED STATISTICS IN SERVICE CHAINS

TECHNICAL FIELD

The present disclosure relates to traceroute functionality, and in particular, traceroute in service function domains.

BACKGROUND

Service chains are sequences of actions or service functions that are applied to packets of traffic as the packets pass through physical and/or virtual network elements. The service functions may be arranged according to pre-defined policies and then deployed using automated processes. A network service header is added to the packets of a data stream and describes a sequence of service nodes that the packet must be routed to prior to reaching the destination address. The network service header may also include metadata information about the packet and/or the service chain.

Traceroute is a diagnostic tool for displaying the route (path) and measuring transit delays of packets across an Internet Protocol (IP) network. The history of the route is recorded as the round-trip times of the packets received from each successive host (remote node) in the route (path). The sum of the mean times in each hop indicates the total time spent to establish the connection. Traceroute proceeds unless the sent packets are lost more than twice, then the connection is lost and the route cannot be evaluated.

DESCRIPTION OF EXAMPLE EMBODIMENTS

Overview

In one embodiment, a packet is received at a network device hosting a service function that is part of a service chain. The packet is sent to the network device from an originating network device. The content of the packet is analyzed to determine that the packet comprises a request for statistical values to be aggregated by the network device. The statistical values are aggregated at the network device. A report comprising the statistical values aggregated at the network device is generated. The report is sent to the originating network device.

Example Embodiments

Figure 1:
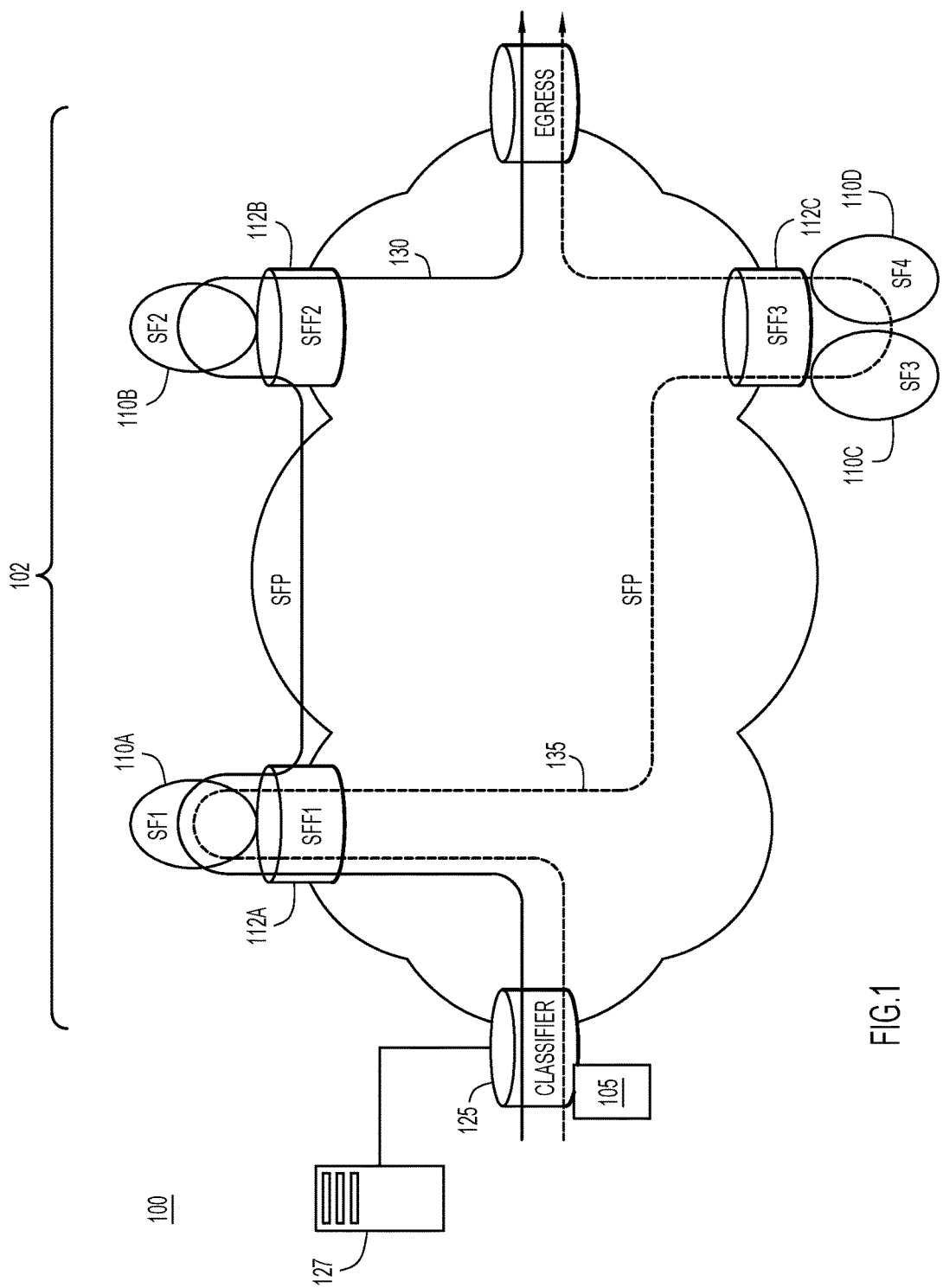
FIG. 1 is an illustration of a service function domain configured to provide traceroute functionality to return aggregated statistics, according to an example embodiment.

With reference to FIG. 1, depicted therein is a network environment 100 that includes service function domain 102 and is configured to provide traceroute functionality for service functions and/or service function forwarders within service function paths, service function chains and/or service function domains. Specifically, service function elements within service function domain 102 are configured to return aggregated statistics to an originating network device in response to traceroute packets. Traceroute packets may be configured to return aggregated statistics for the entirety of service function domain 102, individual service function paths based upon, for example service function path identifiers, and/or individual service functions based upon, for example, service indexes. For example, packet 105, service functions 110A-D and service function forwarders 112A-C are configured such that when packet 105 is received at one or more of service functions 110A-D and/or service function forwarders 112A-C, under certain conditions as will be explained below, service functions 110A-D and/or service function forwarders 112A-C will generate a return packet that includes aggregated statistics regarding the performance of service functions 110A-D and/or service function forwarders 112A-C. This return packet that includes the aggregated statistics may then be returned to the device that served as the originating device for packet 105, such as service chain classifier 125 and/or network device 127 located upstream from classifier 125. Accordingly, the return packet serves as a report of the aggregated statistics to the originating device.

The statistics contained in the return packet may include any Internet Protocol Flow Information Export (IPFIX), or other statistics tracked at service functions and/or service function forwarders. A non-exhaustive list of example aggregated statistics may include:

Packet-In Counters (i.e., a number of packets received);
Packet-Out Counters (i.e., a number of packets transmitted);
Byte-In Counters (i.e., a number of bytes received);
Byte-Out Counters (i.e., a number of bytes transmitted);
Packet Drop Counter (i.e., a number of packets dropped);
Byte Drop Counters (i.e., a number of bytes dropped);
Top talker Application ID; and/or
Service Function Type.

As will be shown in the examples below, each of these types of statistics may be aggregated at the service function-level, the service function forwarder-level, the service function chain-level, at a level that combines two or more service function chains, and/or the service function domain level (i.e., every service function and service function forwarder within the domain). The collection and aggregation of the statistics as described herein may take place at the Services Layer, through the service plane created by the service chain. The collection and aggregation of the statistics may take place above the Infrastructure Layer, and may also be invisible to the Infrastructure Layer.

Service function domain elements 110A-D, 112A-C and 125 are illustrated as separate network elements. Each of these elements may be embodied as a separate network device. According to other example embodiments, one or more of service function elements 110A-D, 112A-C and 125 may be virtualized such that two or more of service function elements 110A-D, 112A-C and 125 execute on a single network device.

According to the specific example of FIG. 1, service function domain 102 includes two service chains, service chain 130 that includes service functions 110A and 110B, and service chain 135 that includes service functions 110A, 110C and 110D. Packet 105 may be injected into service function domain 102 to follow service chain 130, service chain 135, or a traceroute service chain that traverses all service functions 110A-D within service function domain 102 (as will be described in greater detail with reference to FIG. 5). Assuming that packet 105 is configured to traverse service chain 135, packet 105 will be transmitted from classifier 125 to service function 110A. Once received at service function 110A, the packet may be evaluated by service function 110A where it is determined that packet 105 is configured to retrieve aggregated statistics regarding service function 110A. If packet 105 is not configured to retrieve aggregated statistics from service function 110A, but is instead configured to retrieve aggregated statistics from another service function, packet 105 will be forwarded along service chain 135. On the other hand, if the content of packet 105 indicates that it is configured to retrieve statistics from service function 110A, service function 110A may incorporate aggregated statistics into the content of packet 105, and forward packet 105 to service function forwarder 112A. The aggregated statistics may be included in one or more of a header portion of packet 105, such as a metadata field of packet 105, and/or a payload portion of packet 105.

Upon receipt of packet 105, service function forwarder 112A will evaluate packet 105 to determine if it should include aggregated statistics, forward the packet to the next service function, and/or generate a return packet with the aggregated statistics for transmission back to an originating network device. Depending on the content of packet 105, service function forwarder 112A may aggregate its statistical information with the statistical information included in packet 105 by service function 110A, create separate aggregated statistical entries in packet 105, and/or forward packet 105 to a next service function. Service function forwarder 112A may also generate a return packet that includes the aggregated statistics received from service function 110A and/or the aggregated statistics from service function forwarder 112A.

Assuming that packet 105 is forwarded to service function 110C, the process described above with regard to service function 110A will repeat at service function 110C. If service function 110C is not the last service function to be traversed by packet 105, packet 105 may be forwarded to service function 110D, which will also repeat the process described above with regard to service function 110A. Finally, packet 105 will be received at service function forwarder 112C. Packet 105 may be processed at service function forwarded 112C in the same way as described above with reference to service function forwarder 112A. Additionally, if packet 105 is configured to have service function forwarders aggregate statistics on a per-service function forwarder basis, service function forwarder 112C may perform the additional step of aggregating together the statistics from service functions 110C and 110D into a single set of aggregated statistics with service function forwarder granularity.

Figure 2A:
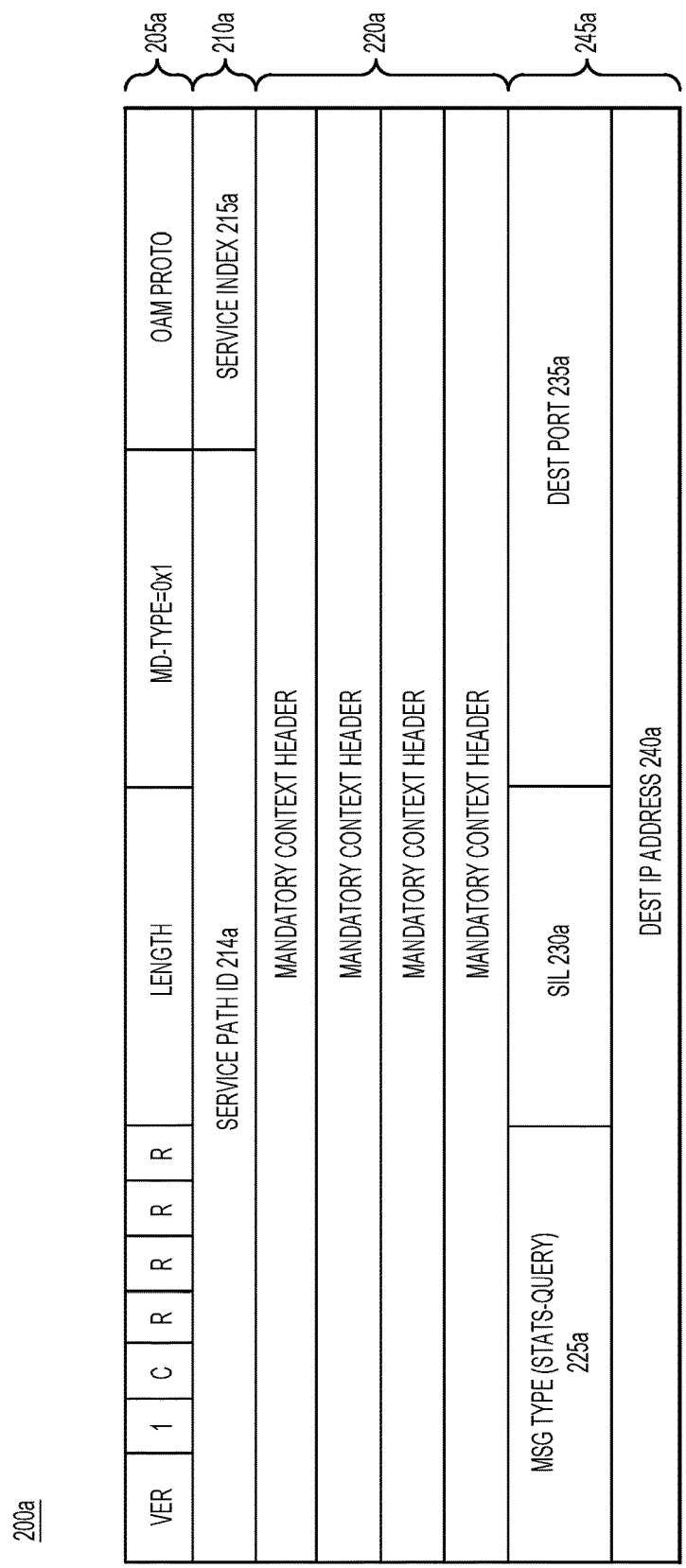
FIG. 2A is an illustration of a packet configured to provide traceroute functionality to return aggregated statistics, according to an example embodiment.

With reference now made to FIG. 2A, depicted therein is an example packet 200a that is configured to provide traceroute functionality to return aggregated statistics. Packet 200a includes a 4-byte base header 205a and a 4-byte service function path header 210a. The base header 205a provides information about the packet 200a. Mandatory context headers 220a carry opaque metadata. Traceroute option portion 245a carries information defining the traceroute procedure to be performed by service function path elements in response to receiving packet 200a.

The service function path header 210a provides path identification and location within path information. For example, service function path identifier 214a indicates which service function path packet 200a will traverse. As will be described with reference to FIGS. 4 and 5, service function path identifier 214a may indicate a service function path used to handle non-traceroute traffic or it may indicate traceroute specific paths which include all service functions and/or service function forwarders within a service function domain. Service index 215a is a counter that indicates where within a service chain packet 200a should be forwarded next. For example, once a service function applies its service to a packet, the service index may be incremented or decrement, depending on the specific implementation, to indicate the next service function to which the packet should be forwarded.

In order to define the type of traceroute procedure to be performed by packet 200a, traceroute option portion 245a includes message type field 225a, service index limit 230a, destination port 235a and destination Internet Protocol (IP) address portion 240a. Specifically, message type field 225a indicates that packet 200a is a traceroute packet configured to return aggregated statistics. For example, based on the content of message type field 225a, service functions and/or service function forwarders will be able to determine which types of statistics to return, and which service functions and/or service function forwarders in a service chain should append aggregated statistics to packet 200a. For example, a predetermined value in message type field 225a may indicate that only a single service function or service function forwarder should return aggregated statistics. Another predetermined value may indicate that every service function or service function forwarder should return aggregated statistics. A third predetermined value may indicate that each service function or service function forwarder up to a particular service chain element should return aggregated statistics. A fourth predetermined value may indicate that statistics for a plurality of service functions and/or service function forwarders should be aggregated and returned as a single statistical value. A fifth predetermined value may indicate that statistics should be returned with per-service function, per-service function forwarder, per-service function chain, and/or per-service function domain granularity.

Service index limit 230a indicates when packet 200a has reached the desired service function and/or service function forwarder for a particular traceroute. For example, if packet 200a is configured to return aggregated statistics for a particular service function (i.e., message type filed indicates that a particular service function is to return its aggregated statistics), the service function that receives packet 200a when the service index 215a matches service function limit 230a will be the service function that appends its aggregated statistics to packet 200a and/or causes a report to be generated in response to packet 200a. Similarly, the service function forwarder that receives packet 200a with a value in service index 215a that is greater than or less than service index 230a (depending on the specific implementation) will be the service function forwarder that generates the return packet that returns the statistics to the originating device. Similarly, when packet 200a is configured to aggregate statistics for multiple service functions and/or service function forwarders, the relative values of service index 215a and service index limit 230a will indicate to the service functions and/or service function forwarders how they should process packet 200a. In other words, the combination of message type field 225a, service index limit 230a, and service index field 215a serves as an indication of how a particular service function and/or service function forwarder should respond to receipt of packet 200a.

Destination port 235a and destination address 240a are used by a service function forwarder when generating a return packet. Specifically, the return packet is addressed to the port contained in destination port 235a and the addressed to the Internet Protocol (IP) address included in destination address field 240a.

Figure 2B:
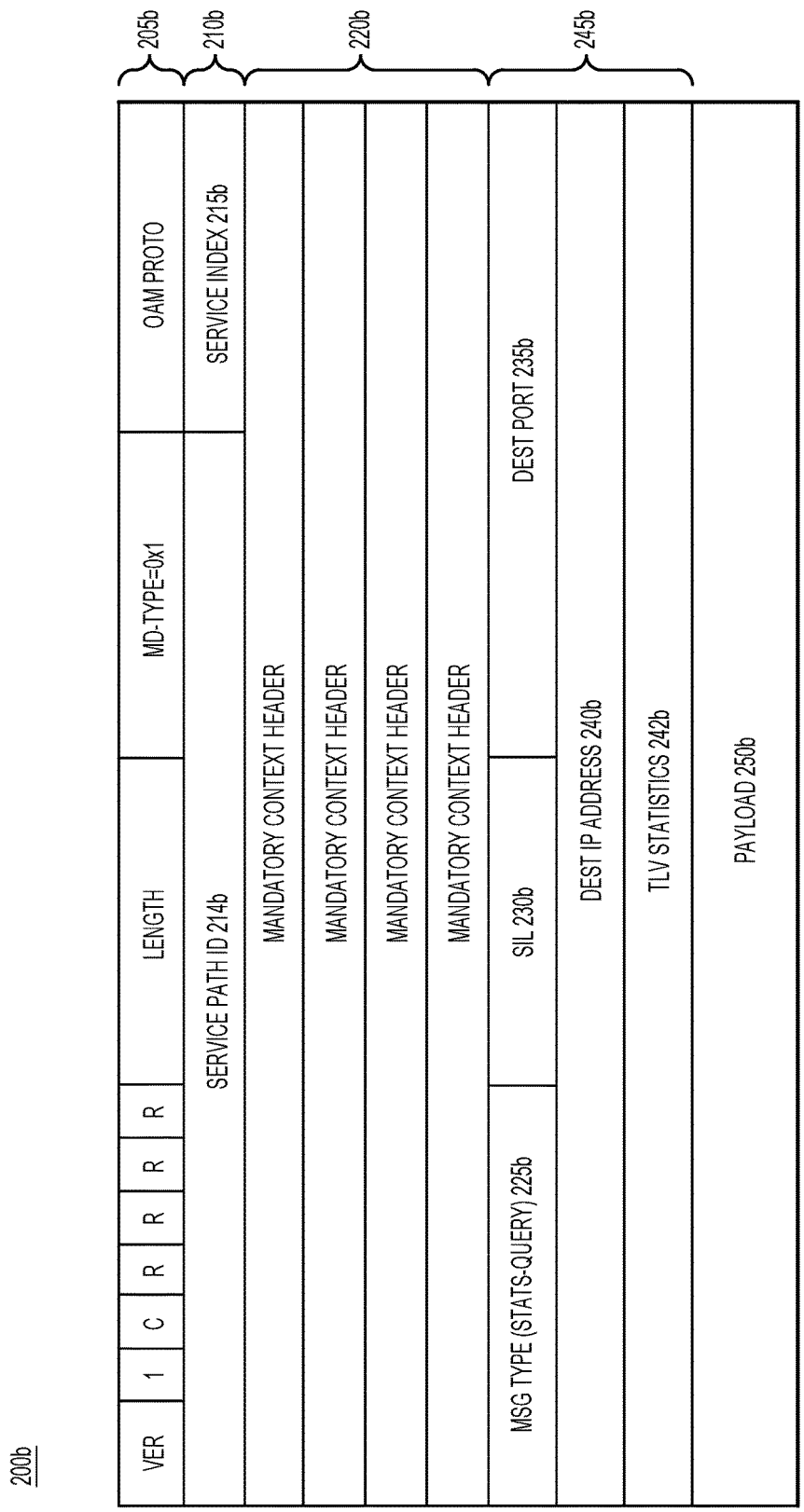
FIG. 2B is an illustration of a packet, including a Network Service Header and a payload portion, configured to provide traceroute functionality to return aggregated statistics, according to an example embodiment.

With reference made to FIG. 2B, depicted therein is an example packet 200b that includes a Network Service Header (NSH) 202b that is configured to provide traceroute functionality to return aggregated statistics. Specifically, packet 200b is an NSH packet configured to provide traceroute functionality, but instead of being a dedicated traceroute packet, it is an NSH that is configured to provide traceroute functionality via the metadata fields available in an NSH. NSH 202b includes a 4-byte base header 205b and a 4-byte service function path header 210b. The base header 205b provides information about the service header 200b and the payload 250b. Mandatory context headers 220b carry opaque metadata. Optional context headers 245b carry variable length type-length-value (TLV) formatted information.

According to the example of NSH 202b, the information that configures NSH 202b to provide traceroute functionality to return aggregated statistics is contained in service function path header 210b and optional context headers 245b. In other words, the values contained in traceroute option portion 245a of FIG. 2A have analogous values in optional context header 245b. Specifically, message type field 225b indicates that packet 200b is a traceroute packet configured to return aggregated statistics.

Service index limit 230b indicates when packet 200b has reached the desired service function and/or service function forwarder for a particular traceroute. Destination port 235b and destination address 240b are used by a service function forwarder when generating a return packet. Specifically, the return packet is addressed to the port contained in destination port 235b and the addressed to the IP address included in destination address field 240b.

Also included in optional context header 245b is time-length-value (TLV) statistics portion 242b. In some example embodiments, when a service function and/or a service function forwarder appends aggregated statistics to packet 200b, the statistics may be appended as TLV data in TLV statistics portion 242b. According to other example embodiments, the statistics may be appended to payload 250b, as a traceroute-specific packet may not include other data in its payload portion. On the other hand, when the traceroute functionality is included in optional context header 245b as illustrated in FIG. 2B, the traceroute functionality as described herein may also be included in a packet that is serving another function, such as transferring normal network traffic through the service chain. Specifically, normal network traffic may be encapsulated in a network service header that includes the traceroute functionality of optional context header 245b. The traceroute processes as described herein may be applied to the packet as it traverses a service chain in response to optional context header 245b, while normal service chain functions are applied to packet payload 250b. In such an example embodiment, the aggregated statistics may not be included in payload 250b, as this portion of the packet will contain the payload for the normal network traffic. Accordingly, the aggregated statistics would be included in TLV statistics portion 242b.

Figure 3:
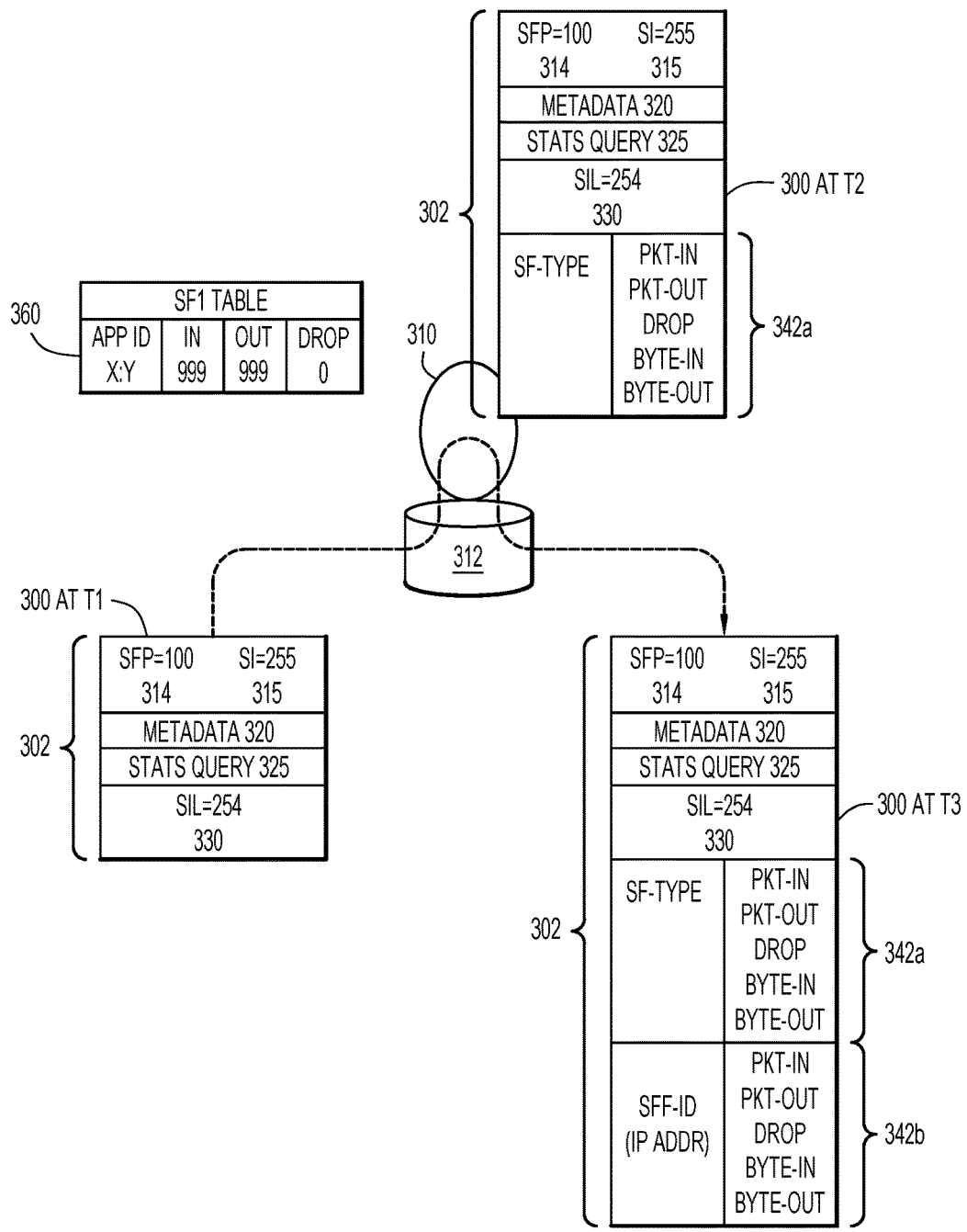
FIG. 3 is an illustration of the processing of a packet configured to provide traceroute functionality to return aggregated statistics as performed by a service function and a service function forwarder, according to an example embodiment.

With reference now made to FIG. 3, depicted therein is a single service function, service function 310, a single service function forwarder, service function forwarder 312, and a packet 300 as it exists prior to being received at service function 310 at time T1, after processing at service function 310 at time T2, and after processing at service function forwarder 312 at time T3. Also indicated in FIG. 3 are service function statistics 360, which represent data stored at service function 310 in table form.

According to the specific example embodiment of FIG. 3, packet 300 is sent to service function 310 at time T1. Packet 300 includes service function header 302. Included in service function header 302 are a service function path identifier 314, a service index 315, mandatory context headers 320, a message type 325 of "Stats Query," and a service index limit 330. When packet 300 is received at service function 310, the service index 315 is decremented from "255" to "254." Next the message type 325 is evaluated, where it is determined that the packet is a "Stats Query" type packet. According to this specific example embodiment, a "Stats Query" packet is a traceroute packet configured to return aggregated statistics for a specific service function and the specific service function forwarder associated with the service function. Because the service index limit 330 is set to a value of "254," packet 300 is configured to retrieve and return statistics for the service function associated with a service index value of "254," as well as its associated service function forwarder. As packet 300 is at service function 310, and service index 315 has a value of "254," service function 310 determines that it is the service function to which packet 300 has been directed. Accordingly, at time T2, service function 310 appends statistical information to packet 300 in the form of statistics 342a. Specifically, service function 310 will append data indicating the type of service function applied by service function 310, an aggregated number of packets received by service function 310, an aggregated number of packets sent by service function 310, the number of packets dropped by service function 310, an aggregated number of bytes received by service function 310, and an aggregated number of bytes sent by service function 310. Other aggregated statistics, including IPFIX statistics, may be added to or replace the statistics illustrated in FIG. 3. Packet 300 is then transmitted to service function forwarder 312.

Once received at service function forwarder 312, service function header 302 is analyzed again, and it is determined that packet 300 is a "Stats Query" packet whose service index 315 is equal to its service index limit 330. Service function forwarder 312 is configured to append its own statistical information 342b to packet 300 at time T3. Based upon these statistics, service function forwarder 312 may generate a return packet that sends these statistics back to an originating network device. If header 302 is encapsulating a packet that is traversing a service chain as part of normal network traffic, packet 302 may continue along the network service chain according to normal service chain processing. If, on the other hand, packet 302 was a traceroute-specific packet, packet 302 may be dropped by service function forwarder 312.

Figure 4:
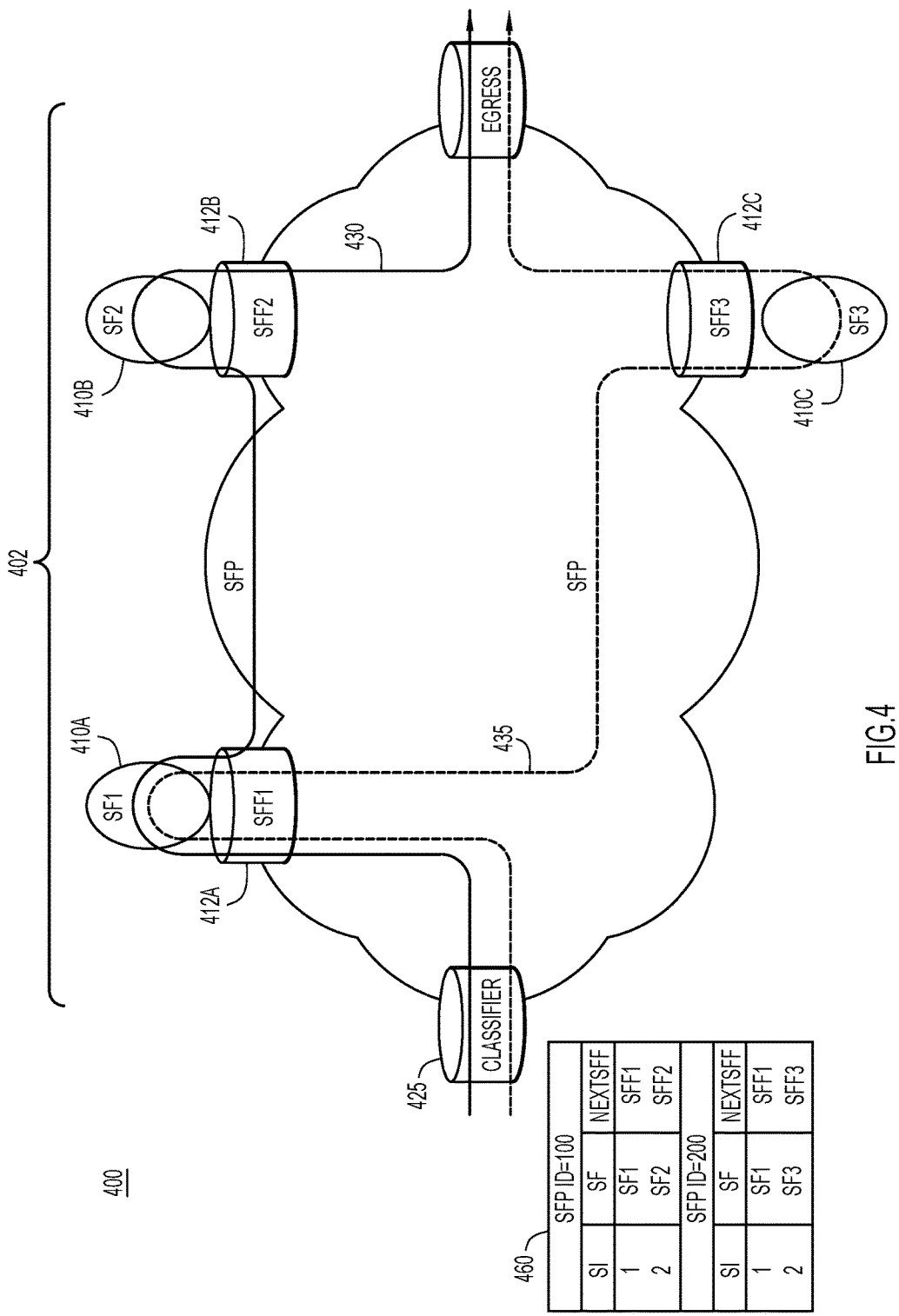
FIG. 4 is an illustration of a service function domain configured to provide service function path-centric traceroute functionality to return aggregated statistics, according to an example embodiment.

With reference now made to FIG. 4, depicted therein is a network environment 400 that is configured to provide service function path-centric traceroute functionality. As illustrated in FIG. 4, service function domain 402 includes two service function paths, service function path 430 and service function path 435. Service function paths 430 and 435 represent paths that service normal service chain traffic. Service function path 430 includes service functions 410A and 410B. The service function forwarders associated with service function 410A and 410B, service function forwarders 412A and 412B, respectively, are also included in service function path 430. Service function path 435 includes service functions 410A and 410C, as well as their associated service function forwarders, service function forwarders 412A and 412C, respectively. Data defining these service function paths are stored at classifier 425 in the form of data 460.

Because neither of service function paths 430 and 435 contains all of the service functions in service function domain 402, a packet containing traceroute functionality must be sent along both of service function paths 430 and 435 in order to collect data from all of the service functions. Specifically, a first packet sent along service function path 430 will collect data for service functions 410A and 410B and service function forwarders 412A and 412B. A second packet sent along service function path 435 will collect data for service functions 410A and 410C and service function forwarders 412A and 412C. In other words, service function domain 402 presents a service function path-centric method of collecting aggregated statistics because it relies on the previously established service function paths that are used to process normal network traffic.

Figure 5:
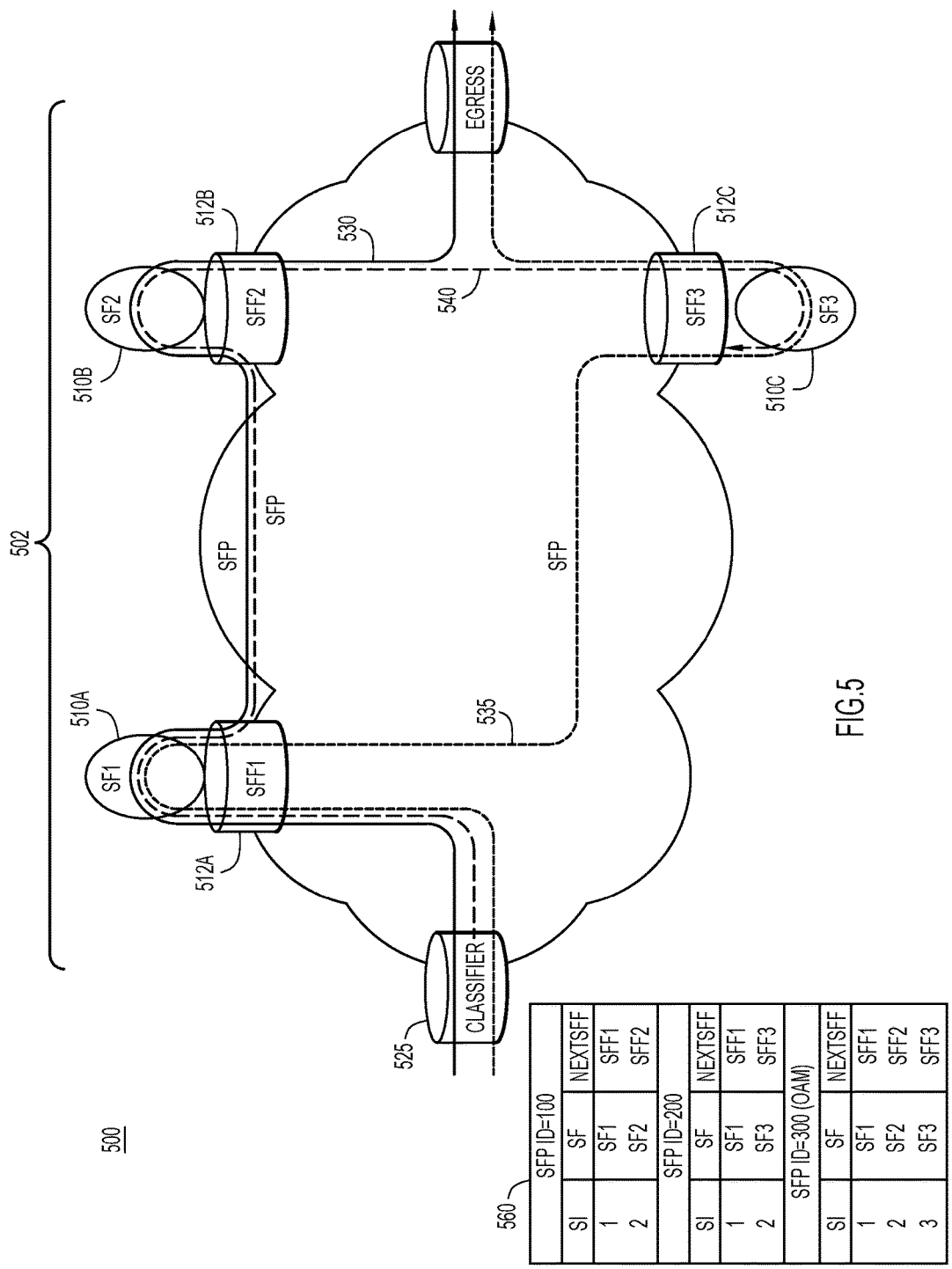
FIG. 5 is an illustration of a service function domain configured to provide Operation Administration and Management-centric traceroute functionality to return aggregated statistics, according to an example embodiment.

With reference now made to FIG. 5, depicted therein is a service function domain 502 that provides Operation Administration and Management (OAM) centric traceroute functionality. Like service function domain 402 of FIG. 4, service function domain 502 includes two service function paths for normal network traffic. Service function path 530 includes service functions 510A and 510B, and their associated service function forwarders 512A and 512B, respectively. Service function path 535 includes service functions 510A and 510C, as well as their associated service function forwarders, service function forwarders 512A and 512C, respectively. Also included in service function domain 502 is service function path 540. Service function path 540 is an OAM service function path that includes all of service functions 510A, 510B and 510C, as well as service function forwarders 51A, 512B and 512C. There may not be network traffic that needs to traverse all three service functions 510A, 510B and 510C, and all three service function forwarders 51A, 512B and 512C. Accordingly, service function path 540 may be used for OAM traceroute procedures that need to traverse all of the service functions within service function domain 502, even though this path may never be used for normal network traffic.

Figure 6:
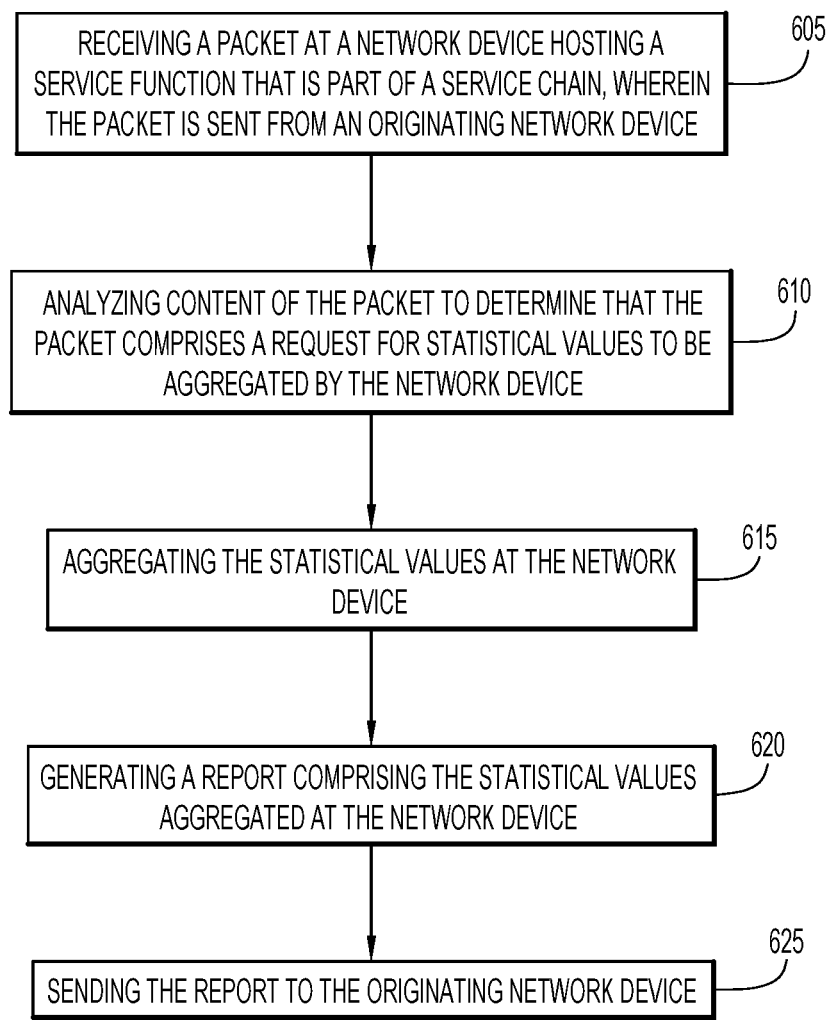
FIG. 6 is a flowchart illustrating a process for performing traceroute functionality to return aggregated statistics, according to an example embodiment.

With reference now made to FIG. 6, depicted therein is a flowchart 600 illustrating a process for providing traceroute functionality to return aggregated statistics. The process of flowchart 600 begins in operation 605 where a packet is received at a network device hosting a service function from an originating device. The service function is part of a service chain. The packet may be a packet configured specifically to provide traceroute functionality to return aggregated statistics. According to other example embodiments, the packet may be a packet encapsulating normal network traffic (i.e., non-traceroute traffic) in a header configured to provide traceroute functionality to return aggregated statistics. Such a packet may provide both traceroute functionality, as well as transmitting normal network traffic through the service chain. Furthermore, the service chain of operation 605 may be a service chain configured to service normal network traffic, or it may be a service chain configured specifically for OAM. Additionally, the network device of operation 605 may be a network device upon which multiple service chain elements (i.e., multiple service functions, multiple service functions forwarders, and/or a classifier) are executing as virtual machines. According to other example embodiments, the network device is specific to the service function of operation 605.

In operation 610, the content of the packet is analyzed to determine that the packet comprises a request for statistical values to be aggregated by the network device. For example, a network service header, such as network service header 202 of FIG. 2 may be analyzed to determine that the packet includes a request for statistical values to be aggregated by the network device. In operation 615, the statistical values are aggregated at the network device. The aggregation of the statistical values may include aggregating statistical values specific to the service function, aggregating statistical values across a plurality of service chain elements, or aggregating statistical values for all service chain elements within a service function domain. For example, statistical values accumulated and/or stored at the service function may be aggregated with statistical values received at the service function within the packet.

In operation 620, a report is generated that includes the statistical values aggregated at the network device, and in operation 625, the report is sent to an originating network device.

Figure 7:
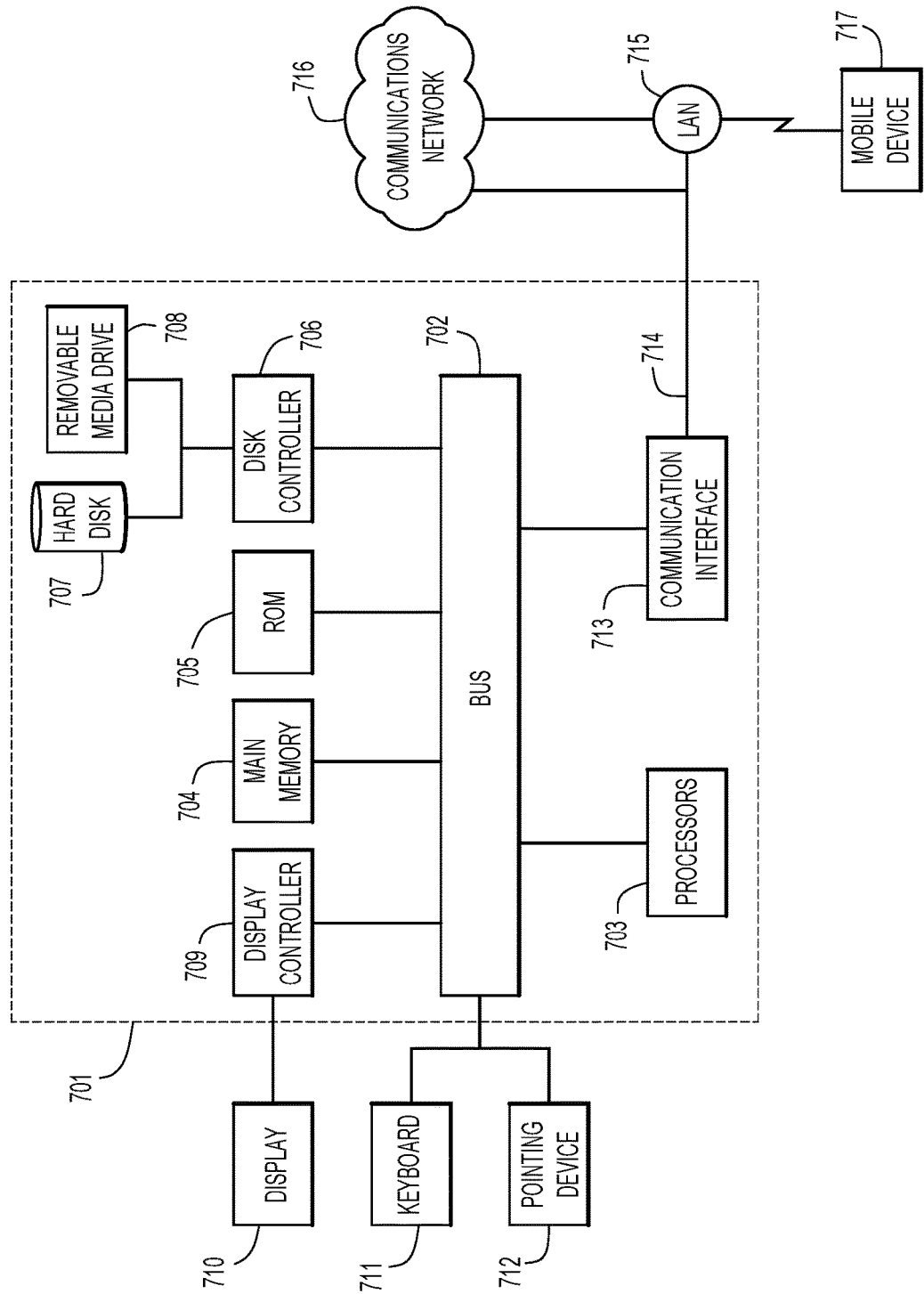
FIG. 7 is block diagram of a hardware device configured to provide traceroute functionality to return aggregated statistics, according to an example embodiment.

With reference made to FIG. 7, illustrated therein is a computer system 701 upon which the embodiments presented may be implemented. The computer system 701 may be programmed to implement a computer based device, such as a device displaying a user interface, executing one or more physical or virtual service chain elements, such as the service chain elements of FIG. 1. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT) or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen. In addition, a printer may provide printed listings of data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

In summary, provided herein are methods which provide traceroute functionality in service function domains. The methods include receiving a packet at a network device hosting a service function that is part of a service chain, wherein the packet is sent from an originating network device. The content of the packet is analyzed to determine that the packet comprises a request for statistical values to be aggregated by the network device. The statistical values are aggregated at the network device. A report is generated that comprises the statistical values aggregated at the network device. The report is sent to the originating network device.

Also provided for herein are apparatuses comprising at least one processor and at least one network interface unit. The at least one processor is configured to provide a service function within a network service chain. The processor is further configured to receive a packet sent from an originating device via the network interface unit. The processor is configured to analyze the content of the packet to determine that the packet comprises a request for statistical values to be aggregated by the apparatus. The processor is configured to aggregate the statistical values and generate a report that comprises the statistical values aggregated by the apparatus. The processor is configured to send the report to the originating device via the network interface unit.

Additionally, described herein are one or more tangible, non-transitory computer readable storage media encoded with software comprising computer executable instructions. The software, when executed, is configured to receive a packet at a network device hosting a service function that is part of a service chain, wherein the packet is sent from an originating network device. The software, when executed, analyzes the content of the packet to determine that the packet comprises a request for statistical values to be aggregated by the network device. Execution of the software causes the statistical values to be aggregated at the network device. The software, when executed, generates a report that comprises the statistical values aggregated at the network device. The software, when executed, sends the report to the originating network device.

Through the methods, apparatus and computer readable media described herein, traceroute functionality may be implemented that provides on-demand collection of statistical values. The techniques described herein also allow for these statistics to be collected with service function, service function forwarder, service function path, and/or service function domain granularity. The statistics may be collected and aggregated for individual elements within a service chain or collected and aggregated for multiple service chain elements. The statistics collection described herein includes functionality not provided for by, for example, the Resource Reservation Protocol (RSVP), Virtual Circuit Connectivity Verification (VCCV), and Inband Operations, Administration and Maintenance (iOAM) processes. Specifically, RSVP is signaling to create traffic engineering tunnels, but does not return aggregated statistical values. VCCV provides signaling and data plane intercept for connectivity verification, as well as providing continuity testing for pseudo-wires, but it does provide for the collection of aggregated statistics as described herein. Finally, iOAM captures telemetry for Internet Protocol version 6 (IPv6), but does not collect aggregated statistics as described herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving a packet at a network device hosting a service function that is part of a service chain, wherein the packet is sent from an originating network device, and wherein the packet comprises a network service header configured to indicate one or more service functions to be applied to the packet;
analyzing the network service header to determine that the packet comprises a request for statistical values to be aggregated by the service function;
aggregating the statistical values at the service function;
appending the statistical values aggregated at the service function to the packet;
forwarding the packet from the service function to a service function forwarder of the network device;
generating a report comprising the statistical values aggregated at the service function; and
sending the report to the originating network device.

2. The method of claim 1, further comprising:
aggregating statistical values at the service function forwarder.

3. The method of claim 2, wherein generating the report comprises generating the report including the statistical values aggregated at the service function and the statistical values aggregated at the service function forwarder.

4. The method of claim 2, wherein:
generating the report comprises generating the report at the service function forwarder, and
sending the report to the originating network device comprises sending the report from the service function forwarder.

5. The method of claim 1, wherein analyzing the network service header comprises analyzing a service index and a service index limit of the packet.

6. The method of claim 1, wherein the packet is configured to traverse each of a plurality of service functions of the service chain.

7. The method of claim 6, wherein generating the report comprises generating the report to include statistical values for each service function of the service chain.

8. The method of claim 1, wherein the service chain is one of a plurality of service chains within a service function domain, and wherein the packet is configured to traverse each service function of the plurality of service chains.

9. The method of claim 8, wherein generating the report comprises generating the report to include statistical values for each service function of the plurality of service chains.

10. The method of claim 1, wherein:
receiving the packet comprises receiving the packet from an intermediate service function arranged between the originating network device and the service function; and
generating the report comprises generating the report to include the statistical values aggregated at the service function and statistical values aggregated at the intermediate service function.

11. An apparatus comprising:
a network interface unit configured to enable network communications; and
a processor configured to provide a service function within a network service chain, wherein the processor is configured to:
receive, via the network interface unit, a packet, wherein the packet is sent from an originating network device, and wherein the packet comprises a network service header configured to indicate one or more service functions to be applied to the packet;
analyze the network service header to determine that the packet comprises a request for statistical values to be aggregated by the service function;
aggregate the statistical values at the service function;

append the statistical values to the packet;
forward the packet from the service function to a service function forwarder of the apparatus;
generate a report comprising the aggregated statistical; and
send the report to the originating network device via the network interface unit.

12. The apparatus of claim 11, wherein the processor is configured to generate the report by including the statistical values aggregated at the service function and statistical values aggregated at the service function forwarder.

13. The apparatus of claim 11, wherein:
the processor is configured to generate the report by generating the report at the service function forwarder, and
the processor is configured to send the report to the originating network device by sending the report from the service function forwarder.

14. The apparatus of claim 11, wherein the processor is configured to analyze the network service header by analyzing a service index and a service index limit of the packet.

15. The apparatus of claim 11, wherein the processor is configured to generate the report by including statistical values for each service function of the service chain.

16. One or more non-transitory computer readable storage media encoded with software comprising computer executable instructions and when the software is executed operable to:
receive a packet at a network device hosting a service function that is part of a service chain, wherein the packet is sent from an originating network device, and wherein the packet comprises a network service header configured to indicate one or more service functions to be applied to the packet;
analyze the network service header to determine that the packet comprises a request for statistical values to be aggregated by the service function;
aggregate the statistical values at the service function;
append the statistical values to the packet;
forward the packet from the service function to a service function forwarder of the network device;
generate a report comprising the statistical values aggregated at the service function; and
send the report to the originating network device.

17. The computer readable storage media of claim 16, further comprising instructions operable to:
aggregate statistical values at the service function forwarder.

18. The computer readable storage media of claim 17, wherein the instructions operable to generate the report are operable to generate the report including the statistical values aggregated at the service function and the statistical values aggregated at the service function forwarder.

19. The computer readable storage media of claim 17, wherein:
the instructions operable to generate the report are operable to generate the report at the service function forwarder, and
the instructions operable to send the report are operable to send the report to the originating network device from the service function forwarder.

20. The computer readable storage media of claim 16, wherein the instructions operable to analyze the network service header are operable to analyze a service index and a service index limit of the packet.

* * * * *